A. MANN.

PRESS BUTTON.

APPLICATION FILED FEB. 2, 1920.

Reissued Oct. 25, 1921.

15,212.

Inventor

ALFRED MANN by his Attorneys

Bradford & Wight

UNITED STATES PATENT OFFICE.

ALFRED MANN, OF BARMEN, GERMANY, ASSIGNOR, BY MESNE ASSIGNMENTS, TO WALDES & CO., INC., OF NEW YORK, N. Y., A CORPORATION OF NEW YORK.

PRESS-BUTTON.

15,212. Specification of Reissued Letters Patent. Reissued Oct. 25, 1921.

Original No. 1,128,341, dated February 16, 1915, Serial No. 698,830, filed May 21, 1912. Application for reissue filed February 2, 1920. Serial No. 355,785.

*To all whom it may concern:*

Be it known that I, ALFRED MANN, residing at 2 Dürerweg, Barmen, Rhenish Prussia, Germany, a citizen of Germany, have invented new and useful Improvements in Press-Buttons, of which the following is a specification.

This invention relates to improvements in press-buttons and particularly to that class of buttons in which the base of the female member is provided with a spring which, reaching into the interior of the cap, holds the male member or stud in its closed position. As is well known these buttons have the draw-back that they easily spring open when attached to blouses or like clothing and when a lateral pull is exerted thereon. To overcome this disadvantage I have constructed the cap and stud in such a manner that both have a ball like shape, so that one fits closely in the other and the cap presents a support for the stud, which latter jams against said support when exposed to lateral pull so that at this time no springing open of the button can take place. With these arrangements in view my invention is shown on the accompanying drawing on an enlarged scale in which—

Figure 1:
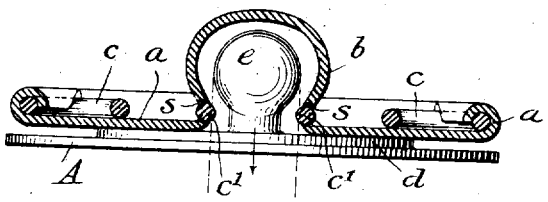
Figure 2:
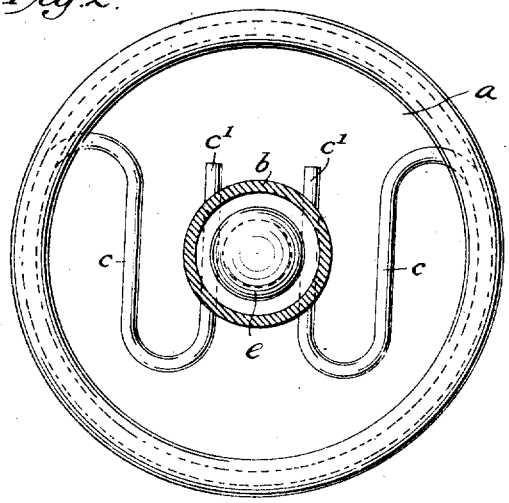
Figure 3:
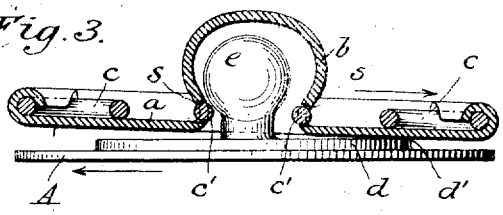

Figure 1 is a vertical section of the female or socket member of the button, the male or stud member being shown in elevation. Fig. 2 shows a horizontal section through the cap or socket, the base of the socket member, the spring and the stud being shown in top plan. Fig. 3 is a view similar to Fig. 1 but indicates the operation of the button when exposed to lateral pull or traction.

Like letters of reference indicate like parts in the drawings.

Referring to the drawings the female or socket member of the button consists of a plate *a* on which is formed the cap *b*. This cap is of particular shape as seen in the drawings, it is made ball like forming in its interior a shoulder or the like *s*.

*c* is the usual wire spring which may be be made of one piece as shown or of two separate pieces and clamped to the plate by means of the rim; its shanks *c'* engage recesses in the cap as shown.

*d* is the plate of the male member which is provided with the stud *e*. This stud is not made cylindrical as usually but has a ball like shape and is of such a diameter as to closely fit the entrance in the cap member as shown by the dotted lines in Fig. 1.

A indicates a piece of cloth to which the stud member is attached.

My new button has the advantage, that it can be opened only when drawn asunder in an axial direction as shown by the arrow, Fig. 1. Any other lateral pull or traction will not separate the members. In such a case when a lateral strain is exerted on the button as indicated in Fig. 3, the head *e* bears against the supports *s* and the rim or edge *d'* of the base of the stud bears against the plate *a* and it is therefore quite impossible to open the button. It may be mentioned that in my button the spring may be made not so strong as in ordinary buttons in which the spring is designed to prevent the self-opening of the button.

It will be observed that the base plate *a* has at its edge an annular substantially tubular flange extending upwardly from it, in which the curved outer portion of the spring *c* is arranged and said plate has also a centrally arranged cap *b* having an enlarged upper portion and a contracted lower portion forming a shoulder or shoulders adjacent the base plate. There are cut-out portions in the cap adjacent the shoulders, into which the inner portions *c'* of the spring *c* extend. The spring shown, as before stated, is of usual construction, comprising curved portions and relatively straight portions, the curved portions giving resiliency to the spring and the outer or straight portions being positioned in the cut-out or slotted portions of the cap and projecting beyond the shouldered portion thereof.

It will be further observed that the opening in the base plate *a* of the socket member through which the head of the stud passes is narrower than the greatest diameter of the socket, being made in fact just wide enough to allow the stud to enter, and this opening is narrower than that part of the cap in which the slots are formed and considerably narrower than the widest part of the socket.

By this construction strain exerted laterally or sidewise on the head of the stud will not cause the disengagement of the members. The edge of the opening forms a stop or shoulder which serves to hold the lower part of the head of the stud as soon as the latter is moved laterally by strain exerted in a sidewise direction as indicated in Fig. 3. When the members are properly connected in the manner shown in Fig. 1, they are held together by the spring *c* in such a way that they cannot be accidentally separated. When it is desired to separate the members strain is exerted in such manner as to draw the stud from the socket through the entrance opening when the base plates of the two members are substantially parallel and when the shank of the stud extends centrally through the entrance opening.

What I claim is:—

1. A press button comprising a stud member and a socket member or cap, the socket member being formed with an opening to receive the stud which is approximately the same diameter as the largest part of the head of the stud and said socket member being formed also with slots, to receive a retaining spring, in a part of the cap which is of less diameter than the widest part thereof.

2. A press button comprising a stud member and a socket member, the stud member having a ball-like head and the socket member having a ball-like cap with a shoulder at the entrance opening of the cap which entrance opening is of substantially the same diameter as the stud head and said ball-like stud when inserted in the cap being normally held by a spring carried by the socket member and extending through slots in the cap adjacent the shoulder.

3. In a press button, the combination with a male member having a ball-like head, of a female member having a rigid ball-like slotted cap formed with a shoulder adjacent the slots against which the stud jams when subjected to lateral strain and said female member being provided with a spring having portions which normally extend through the slots and engage the stud.

4. A press button comprising a stud member and a socket member, the socket member having a centrally arranged rigid cap and being formed with an entrance opening to receive the stud which is of approximately the same diameter as the largest part of the stud and said socket member being formed also with slots, to receive a stud retaining spring, in a part of the cap which is of less diameter than the widest part thereof, said springs being arranged adjacent a shoulder in the cap formed at the entrance opening therein.

5. A press button comprising a socket member consisting of a plate having an annular substantially tubular flanged member extending upwardly therefrom, a centrally arranged cap, said cap having an enlarged portion and a contracted portion forming shoulders adjacent the plate and said cap having cut-out portions or slots adjacent the shoulders, a spring member having an outer portion held by the flange of the plate and inner portions which enter the cut-out portions of the cap adjacent the shoulders, and a stud member having a head of substantially the same diameter as the opening of the cap adapted to enter the socket and engage the spring.

6. A separable fastener comprising a plate having an annular substantially tubular flanged member extending upwardly therefrom, a central cap, said cap having an enlarged portion and a contracted portion forming shoulders adjacent the plate, said shoulders having cut-out portions, a spring member having curved portions terminating in relatively straight portions, the curved portions providing resiliency to the spring, and the straight portions being positioned in the cut-out portions of the shoulders whereby a portion of the spring extends beyond the shoulders, a member carrying a stud, said stud adapted to be positioned in the cap and the outer walls of the stud adapted to engage the straight portions of the spring, substantially as described.

ALFRED MANN.
WALDES & CO.,
By JINDŘICH WALDES,
*A Member of the Firm.*